Jan. 18, 1966      G. P. TOUEY ETAL      3,229,699
PLASTICIZED FILTER
Filed Dec. 21, 1962

GEORGE P. TOUEY
JOHN E. KIEFER
INVENTOR.

BY *R. Frank Smith*
*Abram W. Hatcher*
ATTORNEYS

United States Patent Office 3,229,699
Patented Jan. 18, 1966

3,229,699
PLASTICIZED FILTER
George P. Touey and John E. Kiefer, Kingsport, Tenn., assignors to Eastman Kodak Company, Rochester, N.Y., a corporation of New Jersey
Filed Dec. 21, 1962, Ser. No. 246,362
2 Claims. (Cl. 131—208)

This invention relates to an improved plasticized filter for the selective removal of certain undesirable components from tobacco smoke. In particular, it relates to the addition of certain esters to a tobacco smoke filter made from a crimped tow of cellulose acetate to enhance its capacity for removing phenols from the smoke.

Filters from crimped tows of cellulose acetate fibers are well known to the art and have been described in several patents. For example, see U.S. Patent 2,794,239 and U.S. Patent 3,017,309. The filters described in these several patents have pronounced processing advantages over prior art filters. Some of the more important of these are the rapidity at which they can be continuously manufactured from a bale or roll of tow and the ease at which the crimped continuous fibers can be coalesced together by means of nontacky plasticizers to impart rigidity to the finished filter rod. U.S. Patents 3,003,504 and 3,008,474 described plasticizers which are satisfactory bonding agents for crimped tow filters. These plasticizers are illustrated by esters of glycerine, ethylene glycol, and propylene glycol or phthalic acid ester plasticizers such as dimethoxy ethyl phthalate, methyl phthalyl ethyl glycollate, and dimethyl phthalate.

Although such a method for making a firm cigarette filter from a tow of cellulose acetate fibers has been quite satisfactory, it has been found that the plasticizer-type bonding agents used heretofore have some limitations. One of these is that although the prior plasticizers made a rod of satisfactory firmness they did not enhance the filter's capacity for removing selectively certain undesirable components from the smoke. This was because after a period of storage the plasticizers used heretofore gradually diffused into the fibers. Thus, although they may have had a stronger affinity than the cellulose acetate fibers without plasticizer for a certain component of the smoke, this advantage may be lost by the time the filter was actually used. For example, a cellulose acetate filter with about 6 to 12 percent glycerol triacetate on its fibers surfaces removes more phenol from cigarette smoke than the same filter without triacetin on its surface. However, when the filter has aged for a few weeks this plasticizer apparently diffuses into the fibers. As a result the aged filter, though still firm, is in many instances no more effective for removing phenol than a control filter of the same type but without glycerol triacetate. Somewhat similar results were obtained from tests on all of the other plasticizers which, heretofore, have been most frequently recommended as bonding agents for cellulose acetate filters.

Another problem with the plasticizers which have heretofore been suggested for filter tow is the time required for producing a rigid filter. For example, it requires about two hours' storage at 25° C. for a freshly prepared cellulose acetate tow filter, containing about 10 percent glycerol triacetate, to develop the desirable firmness. The slow curing time may cause "oval" shaped rods to form in the rod collection trays at the end of the filter assembly machine. This is because, for expediency, the tray is placed in a vertical position so that the filter rods are stacked on top of each other in layers. Thus, the pressure of the weight of the rods in a full tray causes the bottom layer of rods to be distorted before they develop sufficient rigidity, or firmness, to resist this distortion. As is known, glycerol triacetate is presently the usual plasticizer bonding agent for cellulose acetate tow filters because it has been thought to be faster in this action than any other plasticizer known for this use up to this time. For example, ethylene glycol diacetate and propylene glycol diacetate at 10 percent concentration in the filter require several days to develop a satisfactory bond. Some of the other available plasticizer bonding agents will not suitably bond the filters unless the plasticizer treated filters are heated to 60° C.

Other problems of the plasticizer type of bonding agents are their taste or odor. Glycerol triacetate and dimethyl phthalate, two room-temperature bonding agents, have a bitter taste. Also, although these plasticizers and other monomeric-type plasticizers have high boiling points, they do volatilize from the filter to some extent during the smoking process. This is particularly so as the burning zone approaches the filter during the last few puffs on the cigarette.

Another problem of the prior art plasticizer types of bonding agents is their water immiscibility. This eliminates the possibility of diluting the plasticizer with water and thereby producing a more economical bonding agent. In addition, when there is an appreciable amount of water (10 to 30 percent) in the plasticizer small amounts of various surfactants can be dissolved in it, thereby enhancing its ability to spread over the surfaces of the fibers in the tow. However, glycerol triacetate which has been under discussion herein containing 1–5 percent water (saturated) will not dissolve the conventional ionic type surfactants such as the alkyl, aryl and alkyl-aryl, sulfates and sulfonates.

Hence it is apparent from the foregoing that the development of more versatile and economical plasticizer material which will give a more versatile filter product represents a highly desirable result. After extended investigation we have discovered several novel polymeric, water-soluble plasticizer combinations and compositions which are useful in filter rod manufacture as will be described in more detail hereinafter.

One object of this invention is to disclose a method for producing a plasticizer-hardened filter of cellulose acetate tow fibers which selectively removes a high percentage of phenol from cigarette smoke and which maintains this high capacity for phenol absorption after months of storage. Another object is to disclose methods for hardening (at room temperature) a filter from a crimped tow of cellulose acetate fibers in a shorter time period than has heretofore been considered possible. Another object is to disclose a method for producing an essentially tasteless and odorless plasticizer bonded cellulose acetate filter. A further object is to disclose a method for incorporating water soluble, but organic solvent insoluble, surfactants and other filter enhancing agents into a plasticizer bonding agent for cellulose acetate tow filters. Other objects will appear hereinafter.

In the broader aspects of this invention these objects are accomplished by applying certain esters or ester combinations to a crimped cellulose acetate tow, and then forming the tow into filter rods by any of the methods described in the prior art. For example, the ester or ester combinations may be sprayed onto the tow by means of a spray gun or it may be applied by means of a wicking device.

One particular form of ester useful in carrying out this invention is the acetic acid, propionic acid, and butyric acid esters of triethylene glycol, tetraethylene glycol, and such poly(ethylene glycols) which have a molecular weight between 300 and 2,000. The amount of poly(ethylene glycol) ester which successfully may be applied to the tow to accomplish the objects of the invention will vary between 4 percent and 20 percent, based on the weight of the tow. Less than about 4 percent of the poly(ethylene glycol) diester results in filter rods which are not as firm as is normally desired in the trade. Increasing the amount of poly(ethylene glycol) ester above about 20 percent does not usually give an additional advantage. The preferred amount of poly(ethylene glycol) diacetate ranges between 5 percent and 12 percent.

For a better understanding of our invention, reference is made to the drawing which forms a part hereof.

Figure 1:
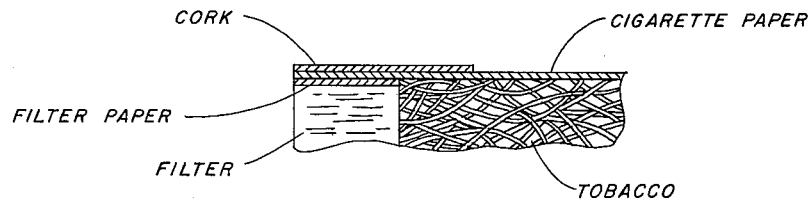
FIG. 1 is a transverse section of a portion of a cigarette with a filter rod such as that of this invention attached.
Figure 2:
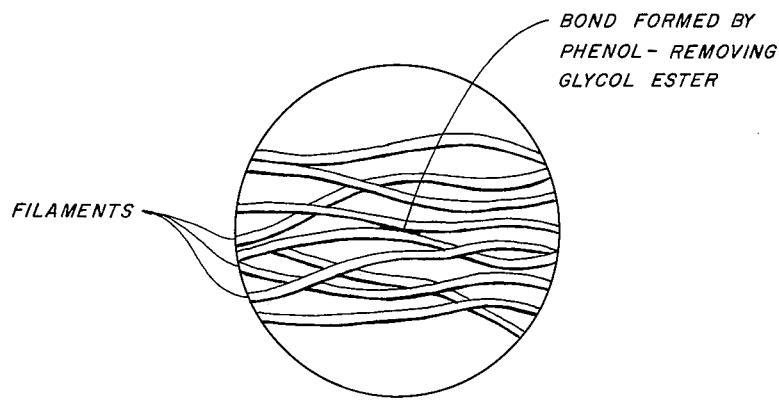
FIG. 2 is an enlargement of a portion of the filter section of FIG. 1 showing filaments bonded with phenol-removing glycol esters according to this invention.

The following examples are illustrative of our invention.

*Example I*

A "tow" consisting of 12,000 cellulose acetate fibers of 5 denier per filament and crimped to 12 crimps per inch was spread out and sprayed with poly(ethylene glycol) diacetate ester (molecular weight 484). The tow which contained 10 percent of the ester was then processed into filter rods on a standard cigarette filter rod-making machine.

After 30 minutes, the rods had become firm. The rods were cut into 17-mm. lengths and attached to a domestic brand of cigarettes. The cigarettes were smoked on an automatic smoking machine. The smoke was collected and analyzed for its phenol content according to the method described by D. Hoffman and E. L. Wynder, Beitrage zur Tobakforschung Heft 3, 101–106.

The smoking experiment was repeated after the filter rods had been aged at room temperature for 4 weeks. The data obtained from these experiments are recorded in Table 1 below.

*Example II*

Example I was repeated except that only 6 percent of the poly(ethylene glycol) diacetate was applied to the tow. The filters were firm after 30 minutes' storage at room temperature.

*Example III*

Example I was repeated except that 10.5 percent poly(ethylene glycol) dipropionate was applied to the tow rather than the 10 percent poly(ethylene glycol) diacetate. The filters were firm after 30 minutes' storage at room temperature.

*Example IV*

This example is included to demonstrate the difference between filters containing the poly(ethylene glycol) diesters described in this invention and filters containing a type bonding agent disclosed previously.

The tow described in Example I was sprayed with 10 percent glycerol triacetate, then fabricated into filter rods as in Example I. The ability of these filters for removing phenol from cigarette smoke is shown by the data in Table 1. It will be noted that although the filters were very efficient when freshly prepared, they were not much better than the "unplasticized" controls after 4 weeks' storage.

TABLE 1

| Bonding agent used in filter | Phenol found in smoke from 100 filter cigarettes | |
|---|---|---|
| | Aged 1 day,[1] mg. | Aged 4 weeks,[1] mg. |
| Control—no additive | 7.0 | 7.1 |
| 9.8 percent poly(ethylene glycol) diacetate | 4.4 | 4.6 |
| 6.2 percent poly(ethylene glycol) diacetate | 5.3 | 5.8 |
| 9.5 percent poly(ethylene glycol) dipropionate | 4.2 | 4.5 |
| 10.3 percent glycerol triacetate | 4.7 | 6.7 |
| 6.7 percent glycerol triacetate | 5.9 | 6.9 |

[1] Aging time refers to time from application of the bonding agent to smoking test.

Although the immediately preceding examples illustrate the use of simple esters of poly(ethylene glycol), esters of poly(ethylene glycol) derivatives could be used. For example, polymers formed by reacting ethylene oxide with glycerine or propylene glycol can be esterified with acetic acid, propionic acid, or butyric acid to produce more complex esters useful in carrying out this invention. Esters of the following glycols have been found useful in carrying out the invention:

(1) 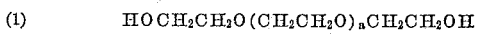
$$HOCH_2CH_2O(CH_2CH_2O)_aCH_2CH_2OH$$

where $a = 1$ to $40$ (2) 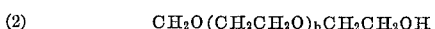
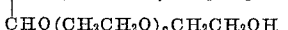
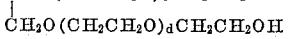
$$\begin{array}{l} CH_2O(CH_2CH_2O)_bCH_2CH_2OH \\ CHO(CH_2CH_2O)_cCH_2CH_2OH \\ CH_2O(CH_2CH_2O)_dCH_2CH_2OH \end{array}$$

where $b$, $c$, and $d = 0$ to $40$ and $b+c+d = 5$ to $40$ (3) 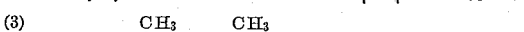
$$HOCH_2\underset{CH_3}{C}HO(CH_2\underset{CH_3}{C}HO)_e(CH_2CH_2O)_fCH_2CH_2OH$$

where $e+f = 6$ to $40$ and $f$ is greater than $e$. The preceding glycols can be esterified with acetic, propionic, or butyric acid to the mono- or diester stage. In some cases, particularly good results were obtained with mixtures of the mono- and diesters. However, in general, the more completely esterified products produced the best results.

Another variation of the above examples is the use of combinations of these newly-disclosed plasticizer esters with plasticizers which have been disclosed previously. For example, glycerol triacetate can be mixed with poly(ethylene glycol) diacetate to produce useful bonding agents for filter rods.

The esters described by the present invention are water-miscible and can be diluted with water. This property is particularly important in that it offers a method of adding water-soluble agents to cigarette filters. For example, water-soluble materials such as amino acids or proteins can be dissolved in water, then mixed with a poly(ethylene glycol) ester and applied to filter tow by the techniques presently in use for applying the bonding agent. This is a more practical method for adding such water-soluble additives to filters than was known previously. It has been shown (U.S. Patent 2,968,306) that filters containing amino acids and proteins remove deleterious components from tobacco smoke.

Although the invention has been described in considerable detail with particular reference to certain preferred embodiments thereof, variations and modifications can be effected within the spirit and scope of the invention as described hereinabove and as defined in the appended claims.

We claim:

1. As an article of manufacture a filter rod adapted for use in filtering tobacco smoke, said rod being comprised principally of a bundle of continuous substantially horizontally aligned plasticizable cellulose acetate filaments some of which are intermingled carrying thereon from 5 to 20% by weight of said filaments of polyethylene glycol diacetate, said ester resulting in minimal diffusion of said ester into the filaments upon storage and assiting in bonding the filament while at the same time improving the phenol-removal capability of the filter rod by maintaining a high capacity for phenol absorption after months of storage, said rod being typified by good firmness even after storage.

2. As an article of manufacture a filter rod adapted for use in filtering tobacco smoke, said rod being comprised principally of a bundle of continuous substantially horizontally aligned plasticizable cellulose acetate filaments some of which are intermingled carrying thereon from 5 to 20% by weight of said filaments of polyethylene glycol diacetate, said rod being characterized by a high capacity for phenol absorption after months of storage coupled with a bonding of filaments by said polyethylene glycol diacetate to a firmness maintained after months of storage.

References Cited by the Examiner

UNITED STATES PATENTS

| | | | |
|---|---|---|---|
| 2,198,665 | 4/1940 | Gloor | 260—488 |
| 2,809,120 | 10/1957 | Sloan et al. | 106—181 |
| 2,953,838 | 9/1960 | Crawford et al. | 131—208 |
| 3,026,226 | 3/1962 | Touey | 131—208 |
| 3,111,702 | 11/1963 | Berger | 131—208 |

OTHER REFERENCES

Arshid, Giles and Gain "Studies in Hydrogen-Bond Formation." The Journal of The Chemical Society, June, 1956, pages 1272 to 1277.

Curme and Johnston "Glycols" (TEXT) published by Reinhold Publishing Co., N.Y.C., 1952, 389 pp., pages 175 and 176.

"Lorillard Smoke Study Shower Damaged Celia" from "Tobacco", June 8, 1962, pages 26 and 27.

ABRAHAM G. STONE, *Primary Examiner.*

MELVIN D. REIN, *Examiner.*